Figure 4:
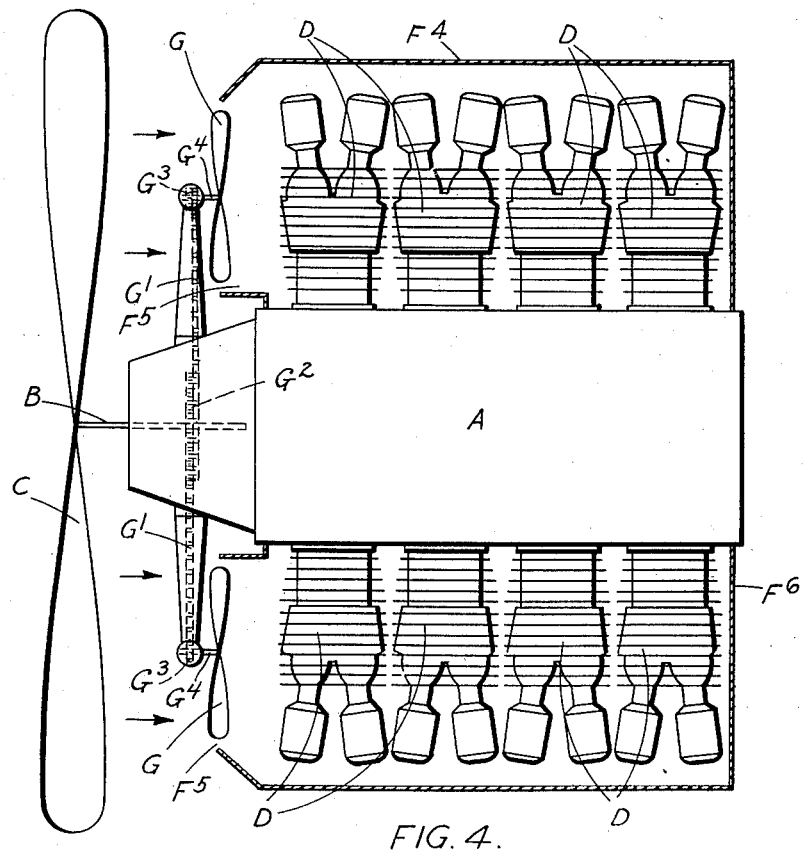

Nov. 25, 1930.  F. B. HALFORD  1,783,085
INTERNAL COMBUSTION ENGINE
Filed April 23, 1928   5 Sheets-Sheet 1
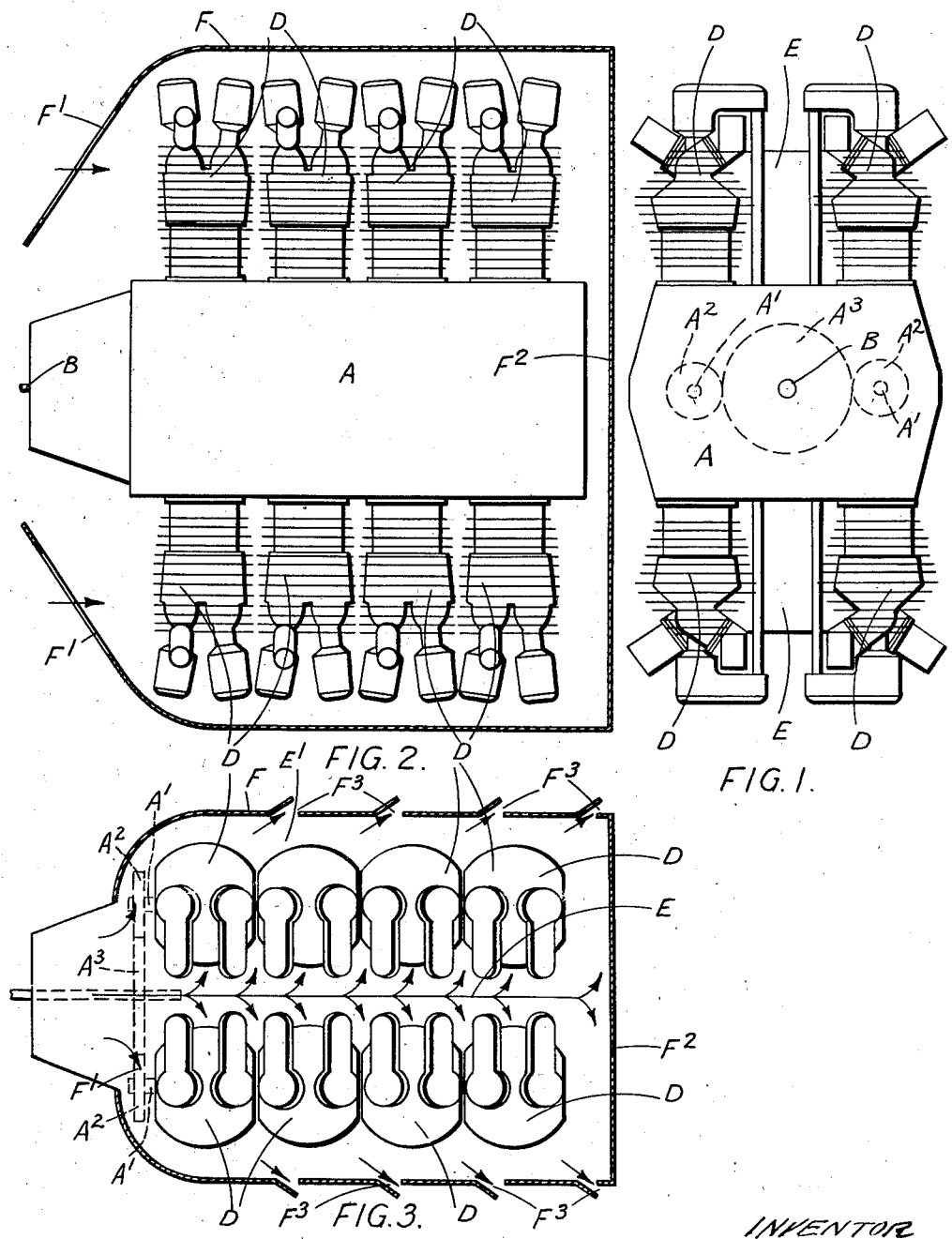

Nov. 25, 1930.  F. B. HALFORD  1,783,085
INTERNAL COMBUSTION ENGINE
Filed April 23, 1928   5 Sheets-Sheet 2

Nov. 25, 1930.　　F. B. HALFORD　　1,783,085
INTERNAL COMBUSTION ENGINE
Filed April 23, 1928　　5 Sheets-Sheet 3
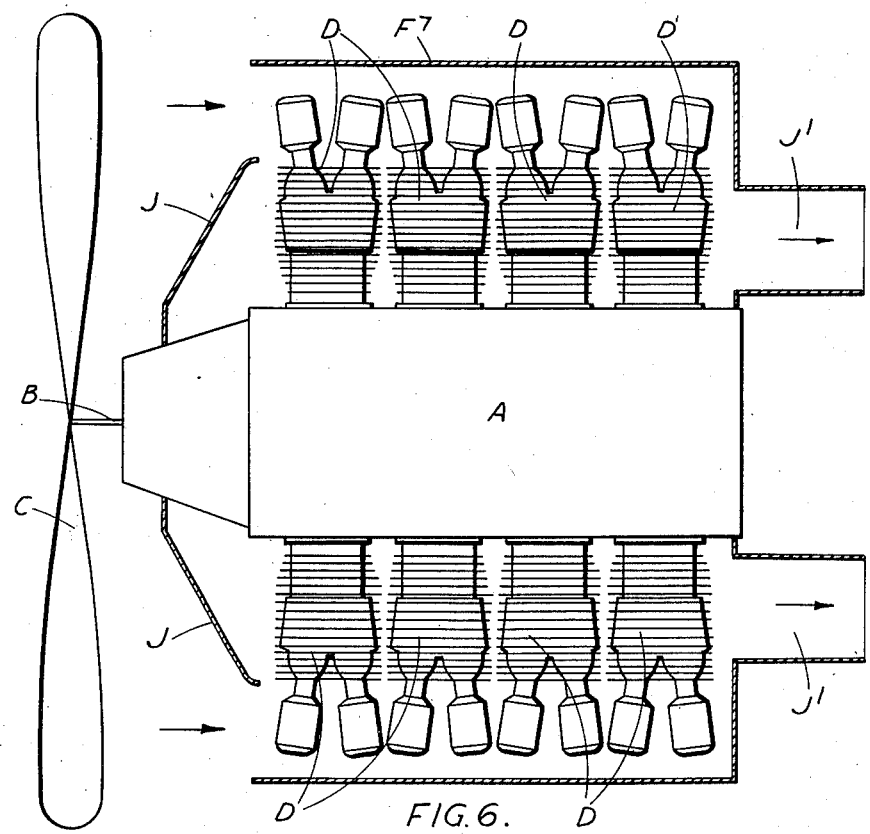
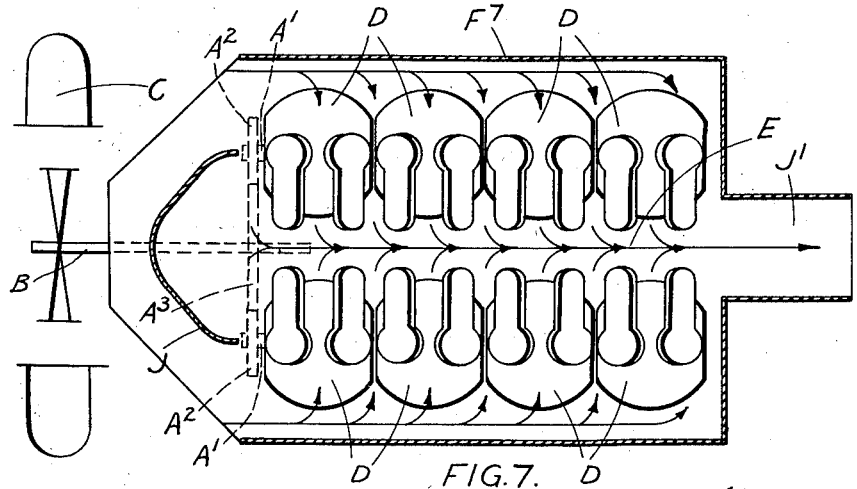
INVENTOR
F. B. HALFORD
BY
ATTYS Nov. 25, 1930.　　F. B. HALFORD　　1,783,085
INTERNAL COMBUSTION ENGINE
Filed April 23, 1928　　5 Sheets-Sheet 5
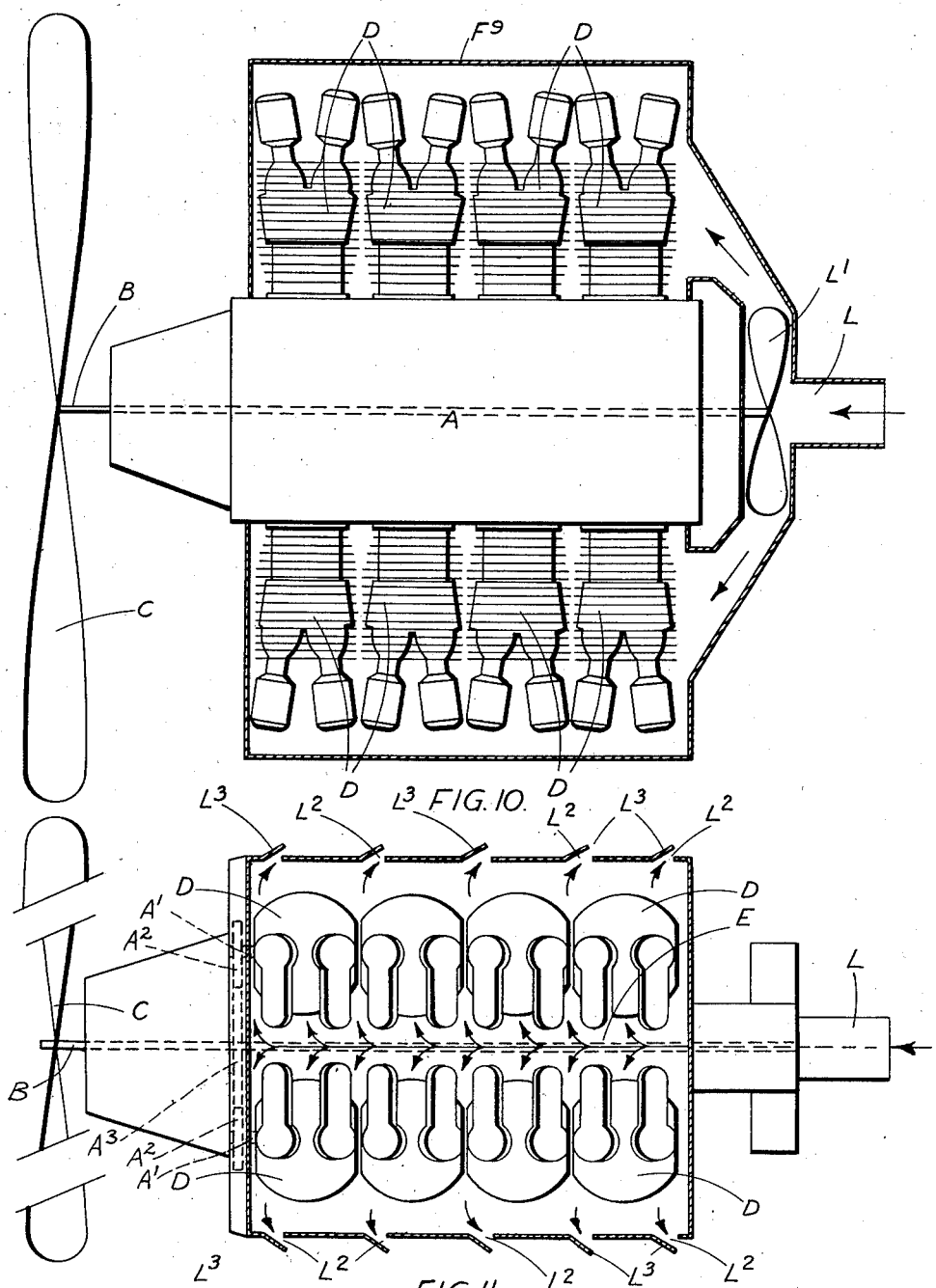

Patented Nov. 25, 1930

1,783,085

UNITED STATES PATENT OFFICE

FRANK BERNARD HALFORD, OF LONDON, ENGLAND

INTERNAL-COMBUSTION ENGINE

Application filed April 23, 1928, Serial No. 272,125, and in Great Britain November 23, 1927.

This invention relates to internal combustion engines of the kind having two parallel crankshafts operatively connected to a common driven shaft and each having associated therewith one or more rows of air-cooled cylinders, and has for its object to provide an engine of this type particularly but not exclusively applicable to aircraft, which while being of compact construction will tend to be adequately cooled.

To this end, according to the present invention, two adjacent rows of air-cooled cylinders each associated with one of the crankshafts and disposed so that the axes of the cylinders in one row are parallel to those of the cylinders in the other row, are combined with means including an obstruction or closure at one end of the air passage or space between the adjacent cylinder rows whereby the air flowing through this space is caused to flow laterally between and over all the cylinders in each row.

Thus air may be caused to flow into this space at the open or unobstructed end thereof, as for instance from a fan or due to motion through the air, and will then be caused to flow laterally outwards therefrom between the cylinders. Alternatively, air may be withdrawn from the air space between the adjacent cylinder rows through the open or unobstructed end thereof by a fan or the like and in this case will be caused to flow into this space laterally between the cylinders. Again, in some cases air may be caused to flow into the space laterally between the cylinders by suitable scoops or guides and will then flow out through the open end of this space. In each of these cases it will be seen that air is caused to flow laterally between the cylinders in addition to longitudinally through the space between adjacent cylinder rows.

Each adjacent pair of cylinder rows is conveniently enclosed in a casing having suitable air inlet and outlet openings arranged so as to cause or assist the desired flow of air, the air being caused to enter and leave the casing respectively through these openings either by reason of motion through the air or by one or more fans. Alternatively, the flow of air caused by motion through the air may be assisted by one or more fans.

Preferably two diametrically opposite rows of air-cooled cylinders are associated with each crankshaft so that each row associated with the one crankshaft lies adjacent and parallel to a row associated with the other crankshaft, one end of the air passage or space between each pair of adjacent rows being partially or wholly closed in the manner set forth above.

It will be seen that in an engine constructed according to this invention whether a single row of cylinders or two rows are associated with each crankshaft, the axes of all the cylinders of the engine are parallel to one another.

In most cases it is preferred to construct the engine so that the axes of all the cylinders are substantially vertical. If desired, however, the cylinders may be arranged so as to extend laterally from the crank case. With either arrangement an engine of compact construction is provided capable of being readily mounted for example on or housed within a fuselage of an aeroplane so as to offer small air resistance.

The invention may be carried into practice in various ways but five alternative arrangements according to this invention are diagrammatically illustrated by way of example in the accompanying drawings, in which Figure 1 is an end elevation of the engine to which the various forms of the present invention are shown applied in the remaining figures, Figure 2 is a side elevation of one arrangement according to this invention in which the flow of air is adapted to be caused by motion through the air, the casing surrounding the engine and serving to cause the flow of air in the desired manner being shown in section.

Figure 5:
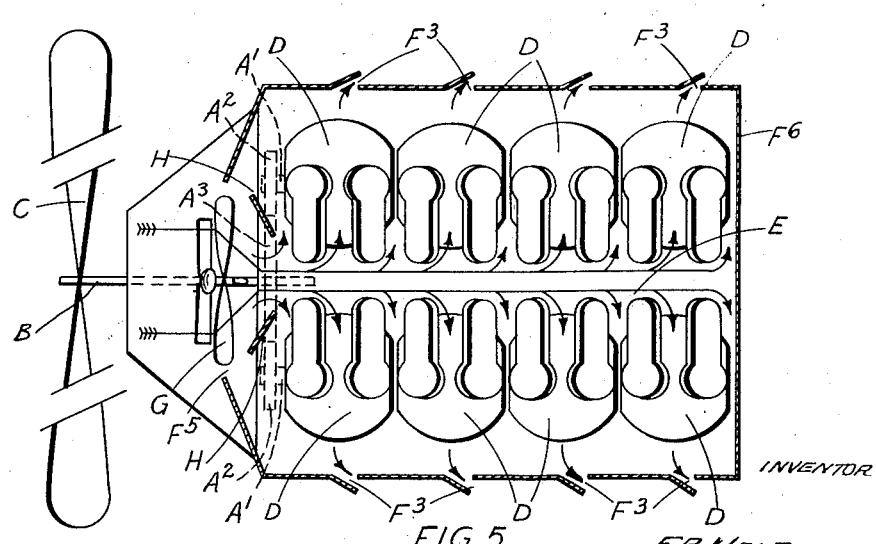
Figure 8:
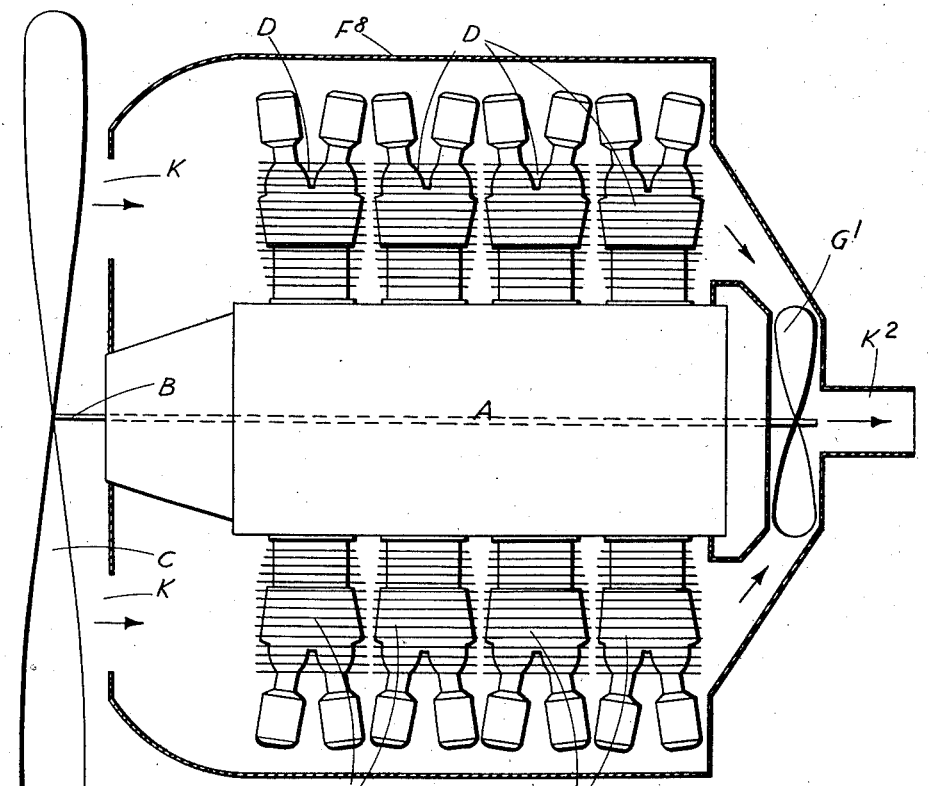
Figure 9:
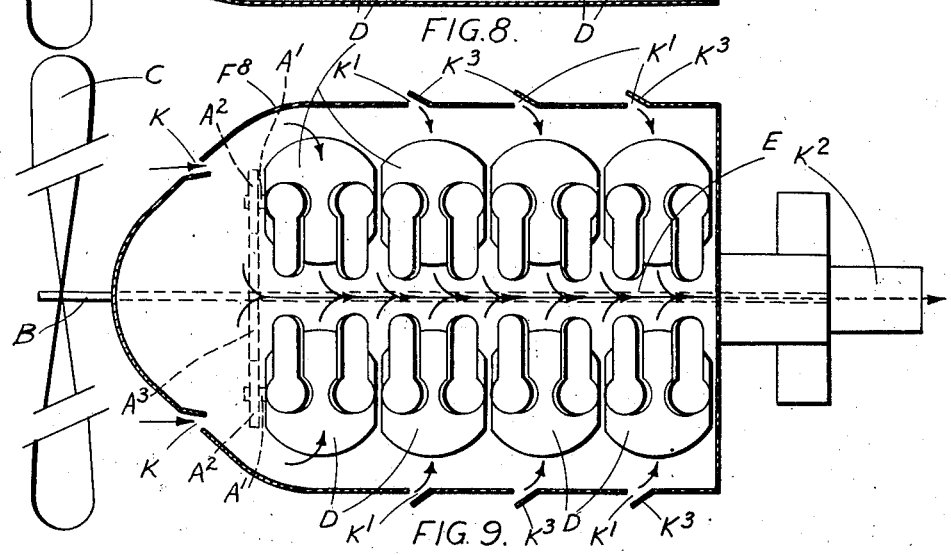

Figure 3 is a plan of the arrangement shown in Figure 2, the casing being shown in section also in this figure, Figures 4 and 5 are similar views respectively to Figures 2 and 3 of an alternative arrangement in which two fans are provided to effect or assist the flow of air through the casing, Figures 6 and 7 are similar views respectively to Figures 2 and 3 of a further arrangement according to this invention, Figures 8 and 9 are similar views respectively to Figures 2 and 3 of a still further arrangement in which a fan is provided adjacent the air outlet opening to assist the flow of air through the casing, and Figures 10 and 11 are similar views to Figures 2 and 3 of a still further arrangement in which a fan is provided adjacent to the air inlet opening to assist the flow of air.

In each of the arrangements illustrated the engine comprises a crank case A in which are mounted two parallel crankshafts $A^1$ each of which is connected by gearing $A^2$, $A^3$ to a common driven shaft indicated at B and carrying a propeller C. The crank case is conveniently formed in two parts separable in a horizontal plane passing through the axis of the shaft B. Carried by the upper part of the crank case A are two parallel rows of air-cooled cylinders D disposed so that the axes of the cylinders in one row are parallel to those of the cylinders in the other row, there being, for example, as shown, four cylinders in each row. Mounted on the lower part of the crank case are two similarly arranged rows of air-cooled cylinders D each associated with one of the crankshafts and disposed diametrically opposite to the other cylinder row associated with such crankshaft. The adjacent rows of cylinders are arranged so that there is an air passage or space E between them through which air can flow.

In the arrangement shown in Figures 2 and 3, the engine is enclosed within a casing F the portion of which adjacent to the front of each pair of cylinder rows is open as shown at $F^1$ so as to permit air to flow into one end of the space E between each adjacent pair of cylinder rows. The rear wall $F^2$ of the casing F is so arranged as partially to obstruct the flow of air from the other end of the space E and a number of slots or openings $F^3$ are provided in the side walls of the casing through which air can flow out. Thus air entering the space E through the openings $F^1$ due to motion through the air or to the rotation of the propeller will be caused to flow outwards through the spaces between adjacent cylinders and thence out through the openings $F^3$. The arrangement is preferably such that some air entering the casing flows directly to the space $E^1$ outside the cylinders whereby air tends to flow over practically the whole cooling surface of each cylinder as indicated by arrows in the drawings and thereby to maintain the cylinders adequately cooled.

The arrangement shown in Figures 4 and 5 is substantially similar to that shown in Figures 2 and 3 except that instead of the flow of air being due solely to motion through the air or to the rotation of the propeller, the engine is enclosed in a casing $F^4$ the front end of which is modified as compared with the casing F shown in Figures 2 and 3 and is provided with two circular air inlet openings $F^5$ in each of which is provided a fan G driven from the propeller shaft B through suitable transmission mechanism e. g. chains $G^1$ connecting sprockets $G^2$, $G^3$ respectively on the shaft B and the shafts $G^4$ of the fans. Further, the rear wall $F^6$ of the casing F actually engages the crank case A of the engine and deflecting plates H are conveniently provided within the casing as shown so as to tend to cause the air from the fans G to flow into the space E between adjacent cylinder rows. This air after flowing laterally between the cylinders leaves the casing $F^4$ through lateral openings $F^3$ as in the construction shown in Figures 2 and 3.

In the arrangement shown in Figures 6 and 7 the engine is enclosed in a casing $F^7$ and a baffle member or plate J is provided which partially obstructs the passage of air into the front end of each space E, the portions of the front of the casing on each side of this baffle being open so that air tends to flow into the casing on the outside of the cylinders. An air outlet $J^1$ is provided adjacent to the rear end of each adjacent pair of cylinder rows, this opening being so placed that the air in flowing from the inlet openings to this outlet opening will be caused to flow inwards between the cylinders into and through the space E as indicated by arrows.

The arrangement shown in Figures 8 and 9 is somewhat similar to that shown in Figures 6 and 7 in that air flows from the space outside the cylinders into the space E between the adjacent cylinder rows. In this arrangement, however, the casing $F^8$ enclosing the engine is provided at its forward end with a number of vertical slots K and similar slots $K^1$ are provided also in the side walls thereof as shown. Air enters the casing through the slots K and $K^1$ and a single outlet opening $K^2$ for all the air is provided substantially coaxial with the propeller shaft as shown, a fan $G^5$ mounted on an extension of the propeller shaft B being provided adjacent to this outlet opening adapted to assist the flow of air through the casing in the desired manner. The air inlets $K^1$ are conveniently provided with scoop members $K^3$ adjacent thereto to assist the flow of air into the casing.

In the arrangement shown in Figures 10 and 11, the forward end of the casing $F^9$ is closed and an air inlet opening L is provided at the rear end through which air is adapted to be forced by a fan $L^1$ mounted on an extension of the propeller shaft B. This air is forced into the space E between adjacent cylinder rows whence it flows outwards between the cylinders in each row and escapes through the lateral openings $L^2$ in the casing, these openings being provided with louvre-like inclined plates L³ adjacent thereto whereby motion through the air will tend to assist the flow of air out through them.

It is to be understood that the number of cylinders in each row and other details of construction may vary without departing from this invention and that, although the invention has been described with particular reference to engines for aircraft, it may be applied to engines for motor road vehicles or other purposes. Further, either a single row of cylinders or two diametrically opposite rows of cylinders may be associated with each of the two crankshafts, each cylinder row associated with one crankshaft being, however, in all cases adjacent and parallel to a cylinder row associated with the other crankshaft and arranged so that the axes of the cylinders in one row are parallel to those of the cylinders in the other row.

What I claim as my invention and desire to secure by Letters Patent is:—

1. An internal combustion engine including in combination a crank case, two parallel crankshafts mounted in the crank case, a driven shaft, an operative driving connection between the crankshafts and the driven shaft, two adjacent rows of air-cooled cylinders associated respectively with the two crankshafts and disposed with the axes of the cylinders in one row parallel to those of the cylinders in the other row, and means including an obstruction at one end of the air space between the adjacent rows of cylinders whereby air flowing through this space is caused to flow laterally between and over all the cylinders in each row.

2. An internal combustion engine including in combination a crank case, two parallel crankshafts mounted in the crank case, a driven shaft, an operative driving connection between the crankshafts and the driven shaft, two diametrically opposite rows of air-cooled cylinders associated with each crankshaft, each row associated with one crankshaft lying adjacent and parallel to a row associated with the other crankshaft with the axes of the cylinders in one row parallel to those of the cylinders in the other, and means including an obstruction at one end of the air space between each pair of adjacent cylinder rows whereby air flowing through this space is caused to flow laterally between and over all the cylinders in each row.

3. An internal combustion engine including in combination a crank case, two parallel crankshafts mounted in the crank case, a driven shaft, an operative driving connection between the crankshafts and the driven shaft, two adjacent rows of air-cooled cylinders associated respectively with the two crankshafts and disposed with the axes of the cylinders in one row parallel to those of the cylinders in the other row, and a casing enclosing at least the cylinders and having air inlet and outlet openings and a part constituting an obstruction at one end of the air space between the adjacent rows of cylinders whereby air flowing through this space is caused to flow laterally between and over all the cylinders in each row.

4. An internal combustion engine including in combination a crank case, two parallel crankshafts mounted in the crank case, a driven shaft, an operative connection between the crankshafts and the driven shaft, two diametrically opposite rows of air-cooled cylinders associated with each crankshaft, each row associated with one crankshaft lying adjacent and parallel to a row associated with the other crankshaft with the axes of the cylinders in one row parallel to those of the cylinders in the other, and a casing enclosing at least the cylinders and having air inlet and outlet openings and a part constituting an obstruction at one end of the air space between each pair of adjacent cylinder rows whereby air flowing through this space is caused to flow laterally between and over all the cylinders in each row.

5. An internal combustion engine including in combination a crank case, two parallel crankshafts mounted in the crank case, a driven shaft, an operative driving connection between the crankshafts and the driven shaft, two adjacent rows of air-cooled cylinders associated respectively with the two crankshafts and disposed with the axes of the cylinders in one row parallel to those of the cylinders in the other row, a casing enclosing at least the cylinders and having air inlet and outlet openings and a part constituting an obstruction at one end of the air space between adjacent rows of cylinders whereby air flowing through this space is caused to flow laterally between and over all the cylinders in each row, at least one fan disposed adjacent to an opening in the casing, and means for driving each fan so as to assist the desired flow of air through the casing.

6. An internal combustion engine including in combination a crank case, two parallel crankshafts mounted in the crank case, a driven shaft, an operative driving connection between the crankshafts and the driven shaft, two diametrically opposite rows of air-cooled cylinders associated with each crankshaft, each row associated with one crankshaft lying adjacent and parallel to a row associated with the other crankshaft with the axes of the cylinders in one row parallel to those of the cylinders in the other row, a casing enclosing at least the cylinders and having air inlet and outlet openings and a part constituting an obstruction at one end of the air space between each pair of adjacent cylinder rows whereby air flowing through this space is caused to flow laterally between and over all the cylinders in each row, at least one fan disposed adjacent to an opening in the casing, and means for driving the fan so as to assist the desired flow of air through the casing.

In testimony whereof I have signed my name to this specification.

FRANK BERNARD HALFORD.